Figure 1A:
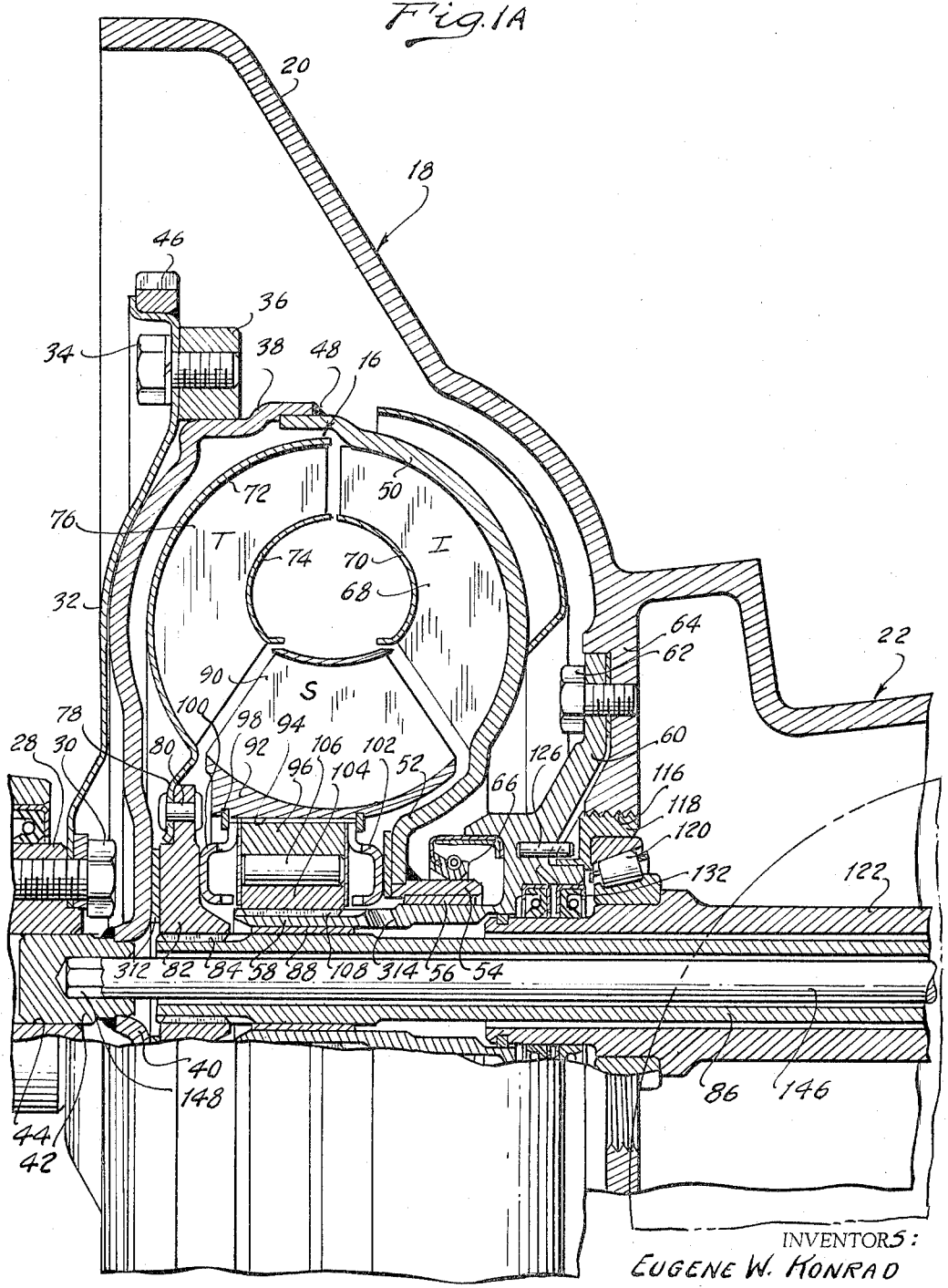

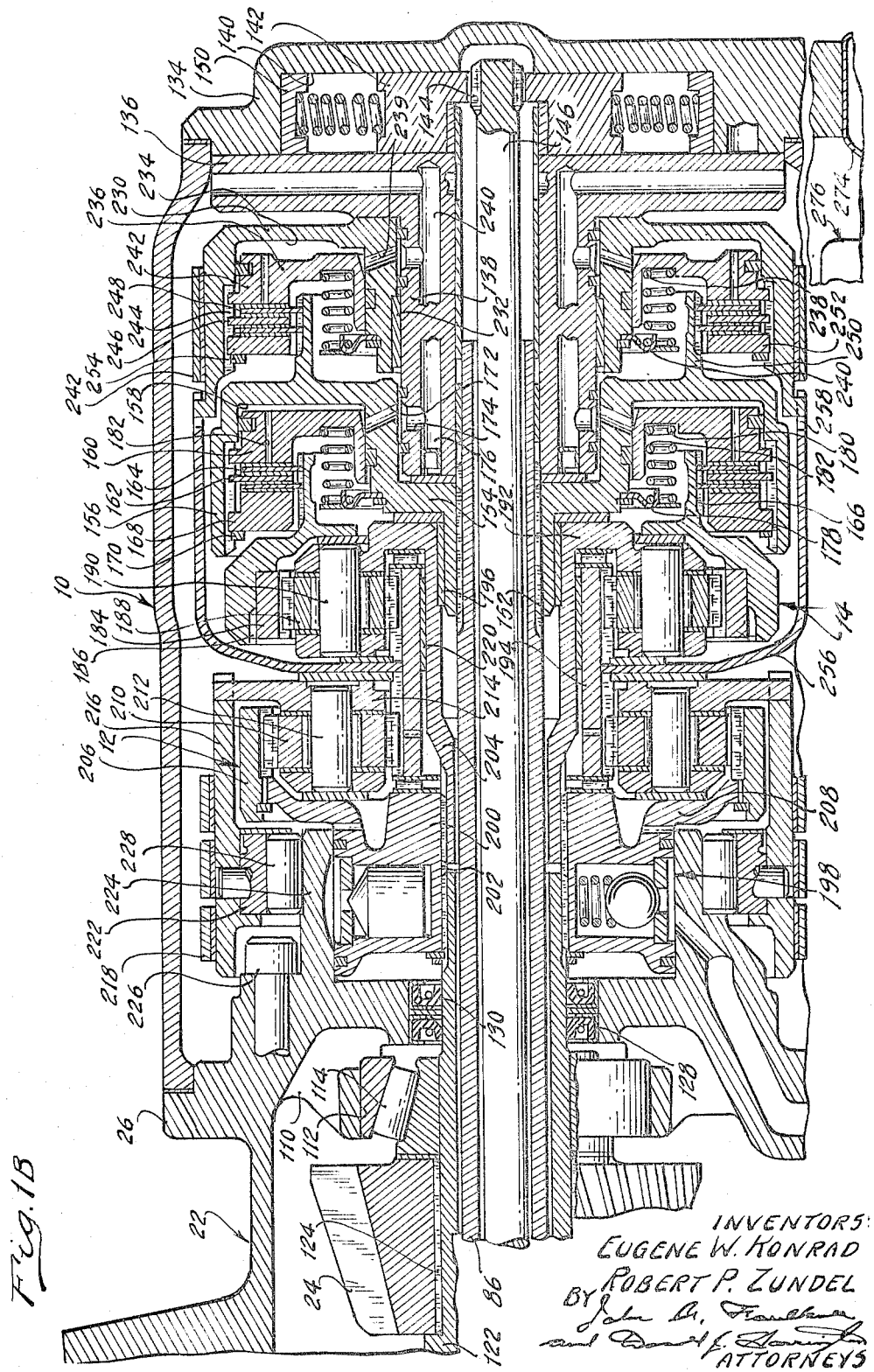

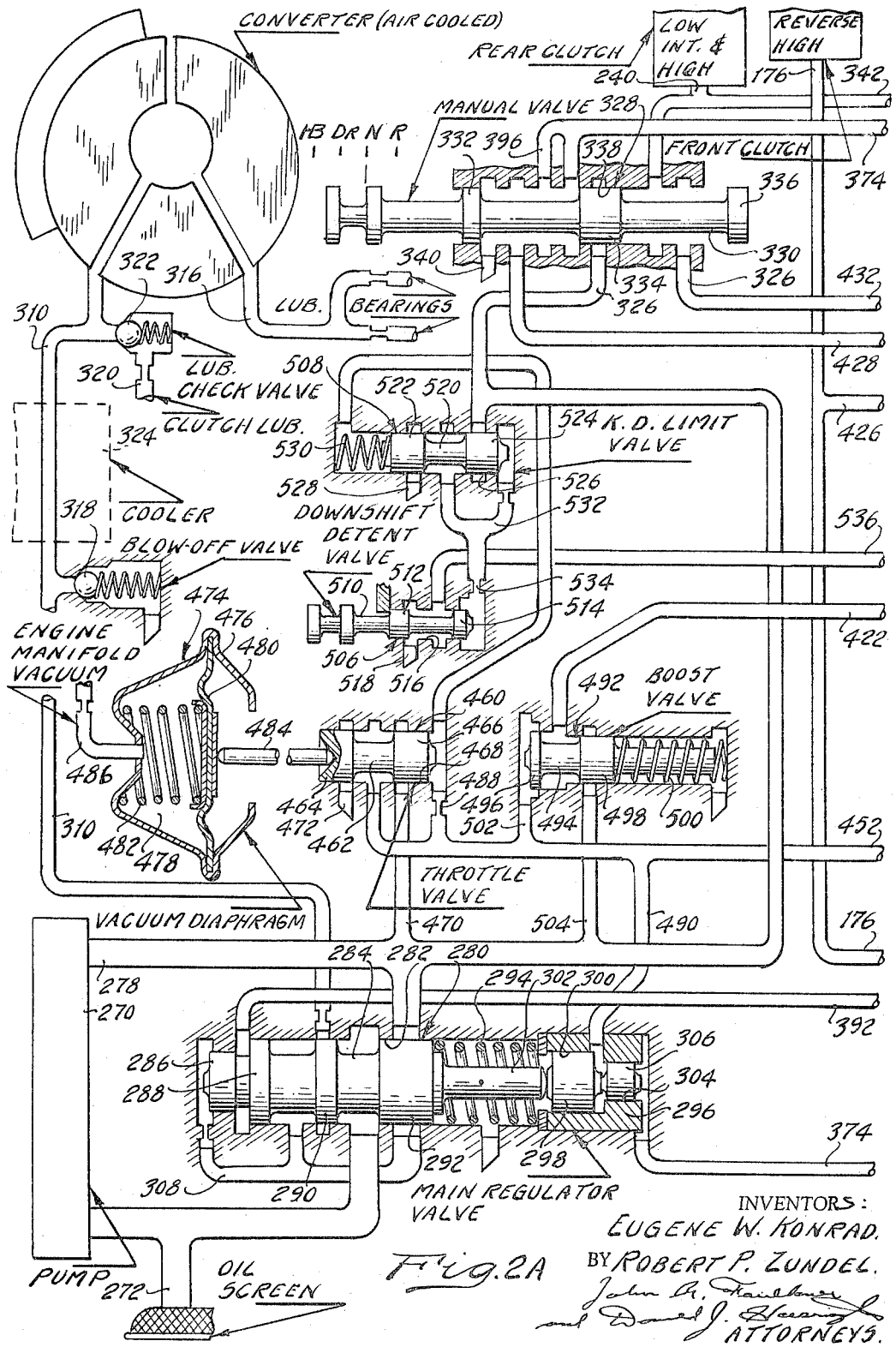

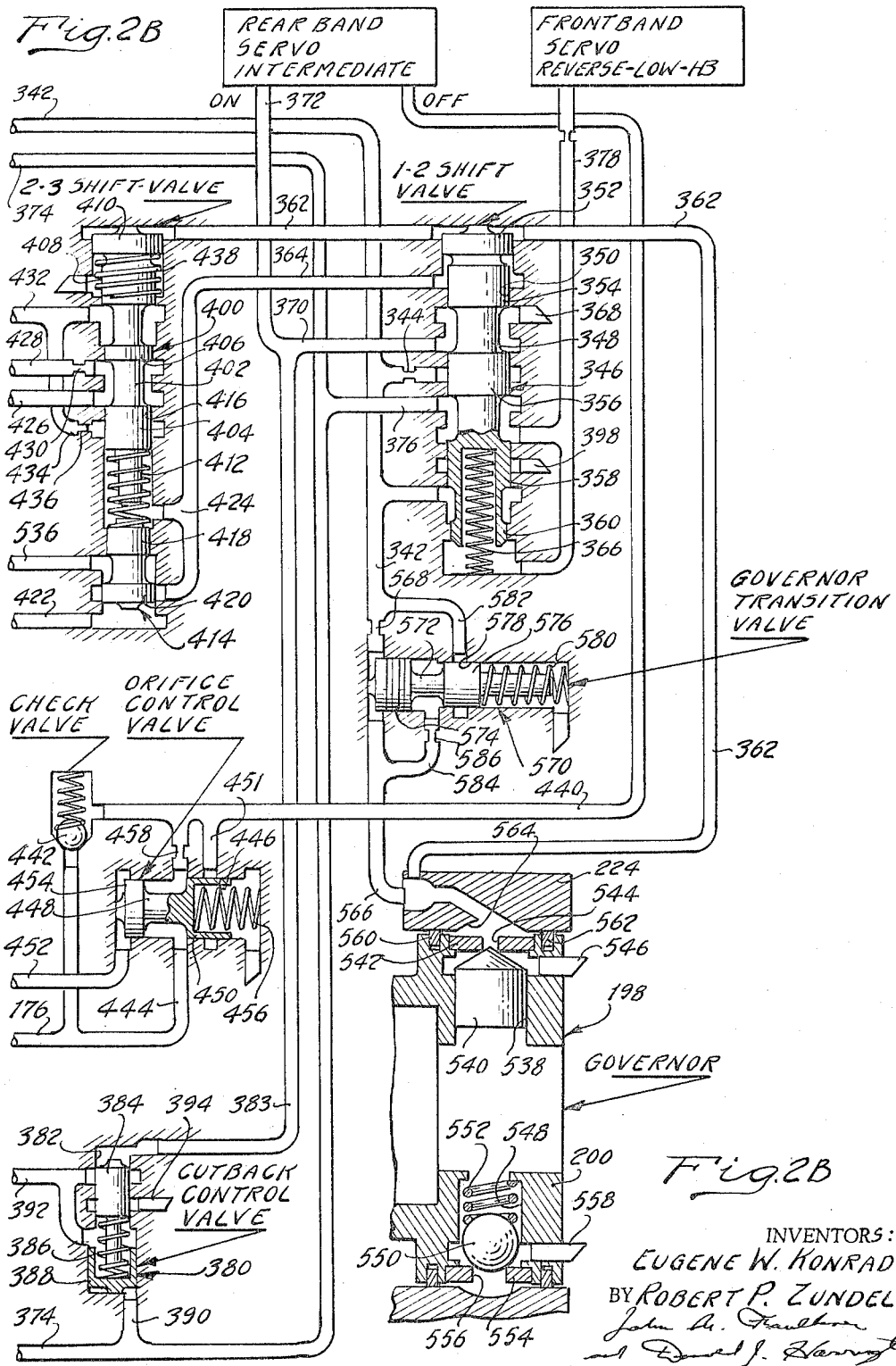

United States Patent Office 3,274,848
Patented Sept. 27, 1966

3,274,848
MULTIPLE SPEED RATIO POWER TRANSMISSION MECHANISM AND AUTOMATIC CONTROL SYSTEM
Eugene W. Konrad, Northville, and Robert P. Zundel, Wayne, Mich., assignors to Ford Motor Company, Dearborn, Mich., a corporation of Delaware
Filed Aug. 22, 1963, Ser. No. 303,839
12 Claims. (Cl. 74—472)

Our invention relates generally to improvements in automatic power transmission mechanisms with clutch and brake controlled gear elements that are adapted to establish plural torque delivery paths from a driving member to a driven member. The disclosed embodiment of our invention is adapted particularly to be used in the driveline of an automotive vehicle having an internal combustion engine.

The gear elements and the clutch and brake structures of our improved mechanism are arranged in a compact fashion to provide reduced overall dimensions for any given torque transmitting capacity. The gear elements act in combination with a hydrokinetic torque converter unit having an impeller that is drivably coupled to a power input element of the gear system. The clutch and brake structures include servos that respond to pressure supplied by an engine driven control pump. Distribution of pressure from the pump to the clutch and brake servos is controlled by shift valves that in turn respond to an engine power signal and a vehicle speed signal.

The power signal in a preferred embodiment of our invention is obtained by means of an engine intake manifold pressure operated servo and modulator valve, the output signal of which is distributed to a pressure land on each of the shift valves.

The speed signal, by preference, is obtained by means of a simplified dual range governor valve mechanism that includes a high speed range modulator valve element and a low speed range modulator valve element, each valve element functioning to provide a back pressure in a governor pressure passage that extends to the shift valves. The degree of back pressure developed by the governor valve mechanism is utilized as a measure of speed. The governor valve mechanism is supplied by means of a passage extending from a high pressure region of the control system, and provision is made for varying the degree of restriction in this passage to reduce to a minimum the degree of leakage past the governor valve elements during low speed operation while providing the necessary increased flow to the governor valve mechanism during operation in a high speed range.

The provision of such a power transmission mechanism being a principal object of our invention, it is another object of our invention to provide a mechanism of this type wherein provision is made for overruling the influence of the shift valve signals by means of a driver controlled downshift valve mechanism. We contemplate that a forced downshift or kick-down can be accomplished by distributing control pressure from a high pressure region of the control system to the shift valves after first modulating the kick-down pressure by means of an appropriate modulator valve assembly that establishes the proper kickdown shift points.

It is another object of our invention to provide an improved control pressure regulator valve arrangement in a system of the type above set forth wherein provision is made for reducing the magnitude of the regulated control pressure level as the overall speed ratio increases following acceleration from a standing start. We contemplate further that the shift valve which controls the automatic speed ratio shifts from the low speed ratio to an intermediate speed ratio will act in combination with the main regulator valve to initiate an automatic control pressure cut-back during operation in a high-speed range.

It is another object of our invention to provide a valve system of the type above set forth wherein provision is made for manually selecting either of two drive ranges by selectively overruling the automatic speed ratio changes. Provision is made, however, for inhibiting the action of the manual control during operation of the vehicle at a speed higher than a desired minimum value as the mechanism is conditioned for operation in the low speed range. The shift valve that controls speed ratio changes between the low speed ratio and the intermediate speed ratio will exert an inhibiting influence to prevent downshifting of the transmission mechanism to the low speed ratio at a speed that is greater than the speed at which a normal intermediate to low downshift would occur of any given engine manifold pressure. Once such a downshift occurs, however, automatic upshifts will be prevented and the transmission mechanism will be locked in the low speed operating range.

It is a further object of our invention to provide a system of the type above set forth wherein the power signal applied to the shift valves is reduced by a throttle pressure reducer valve having separate portions that are subjected respectively to the pressure signals of the vacuum controlled servo and modulator valve arrangement and to the manually controlled downshift valve structure so that proper shift points can be established for forced downshifts as well as normal torque demand downshifts. It is possible, therefore, to calibrate each shift point separately without adversely influencing the others.

Further objects and features of our invention will become apparent from the following description and from the accompanying drawings, wherein:

FIGURES 1A and 1B show a longitudinal cross-sectional view of the power transmitting portions of our invention; and FIGURES 2A and 2B show schematically an automatic control valve system that is adapted to control the operation of the clutches and brakes of the mechanism of FIGURES 1A and 1B.

Referring first to FIGURES 1A and 1B, numeral 10 designates generally a housing portion for the gear system of our invention. It encloses a pair of simple planetary gear units 12 and 14 which establish the geared power flow paths as subsequently will be explained.

A hydrokinetic torque converter unit is designated generally by reference character 16. It is enclosed within a housing portion 18 having an outer margin 20 which may be bolted or otherwise secured to the engine block for an internal combustion vehicle engine.

The margin at the other end of housing portion 18 is secured to or joined integrally with an intermediate housing portion 22 which encloses a right-angle drive differential gear assembly that is adapted to deliver torque from a driving pinion 24 to each of two axle shafts.

Housing portion 22 includes an end flange 26 which may be bolted to one end of the housing portion 10.

A crankshaft 28 for the internal combustion engine is bolted by means of bolts 30 to a drive plate 32. The periphery of the plate 32 is bolted by means of bolts 34 to a ring 36 which in turn is secured by welding or by any other suitable fastening technique to the periphery of an impeller shell part 38.

Shell part 38 is generally toroidal in form and welded at its inner periphery 40 to a pilot element 42 which in turn is received within an opening 44 in the adjacent end of the crankshaft 28.

The periphery of drive plate 32 carries a ring gear 46 for the internal combustion engine starter motor.

The outer periphery of shell part 38 is welded, as shown at 48, to a second shell part 50. This shell part also is formed with a generally toroidal shape and its hub 52 is welded to a pilot sleeve shaft 54.

Sleeve shaft 54 is journaled by means of a bushing 56 upon a stationary sleeve shaft extensioin 58 of an adaptor 60. The adaptor is secured by means of bolts 62 to an intermediate wall 64 which forms a part of the housing portion 18. A suitable fluid seal 66 is situated between the shaft 54 and a surrounding opening formed in the adaptor 60.

The impeller is identified in FIGURE 1A by the symbol I. It includes blades 68 which are secured at their outer margins to the interior of the shell part 50. An inner shroud 70 is secured to the inner margins of the blades 68 thereby completing radial outflow passages.

The flow exit region of the impeller is situated directly adjacent the flow entrance region of a turbine that is generally identified in FIGURE 1A by the symbol T. The turbine includes an outer shroud 72, an inner shroud 74 and turbine blades 76 situated between the shrouds. Blades 76 cooperate with the shrouds to define radial inflow passages.

The inner periphery 78 of the shroud 72 is riveted, as shown at 80, to a hub 82. This hub in turn is internally splined at 84 to a turbine sleeve shaft 86. Shaft 86 is supported by means of a bushiing 88 upon a stationary sleeve shaft extension 58.

A bladed stator S is disposed between the flow exit region of the turbine and the flow entrance region of the impeller. It includes stator blades 90 carried by a stator shroud 92. Shroud 92 is formed with a central splined opening 94. An outer overrunning coupling race 96 is secured within the splined opening 94 and held axially fast with respect to the shroud 92 by means of snap rings 98. A spacer element 100 is disposed between race 96 and hub 82. Similarly a spacer element 102 is situated between race 96 and the inner peripheral portion of the shell part 50.

An inner overrunning coupling race is shown at 104. Overrunning coupling elements, preferably in the form of rollers 106, are situated between the races 96 and 104. Race 96 can be cammed to establish clutching action with the rollers 106 to inhibit rotation of the stator in a direction opposite to the direction of rotation of the impeller although freewheeling motion in the other direction is accommodated. Inner race 104 is splined at 108 to the stationary sleeve shaft 58.

Housing portion 22 includes an end wall 110 having a bearing opening 112 within which is situated a tapered roller bearing 114. Wall 64 also includes an opening 116 which is internally threaded to receive an externally threaded bearing retainer 118. Another tapered roller bearing 120 is disposed within the retainer 118.

The inner races of the bearings 120 and 114 support a power output sleeve shaft 122. This shaft is splined at 124 to permit a driving connection with the power output bevel pinion 24. Axial adjustment of the bearings 120 and 114 to provide proper operating clearance is accomplished by means of a threaded bearing retainer 118. The final adjusted position of the retainer 118 is maintained by means of a retainer pin 126 carried by the adaptor 60.

Wall 110 includes a seal opening 128 for a fluid seal 130 which surrounds sleeve shaft 122. Similarly, adaptor 60 is provided with a seal 132 which surrounds the other end of the sleeve shaft 122.

The right hand end of housing portion 10, as viewed in FIGURE 1B, has secured thereto an end closure plate 134. Secured to the inner surface of the plate 134 is an adaptor 136 having an axially extending sleeve shaft portion 138. The connection between adaptor 136 and plate 134 can be made by means of bolts, not shown.

A pump chamber 140 is defined by the plate 134. A pump rotor 142 is received within the chamber 140 and splined at 144 to a pump drive shaft 146. This shaft extends through the center of sleeve shaft 86 and is keyed or splined at its left hand end, as viewed in FIGURE 1A, to the hub 42 located within the opening 44 in the crankshaft 28. The connection between shaft 146 and the hub 42 is identified by reference character 148.

Fluid pumping elements 150 are carried by the rotor 142 and cooperate with suitable ports to provide a control pressure source that is utilized by an automatic control valve system subsequently to be described.

The turbine shaft 86 is splined at 152 to a clutch member 154. This member includes a portion that surrounds the end of extension 138 and a radially extending portion that defines a drum 156. An annular cylinder 158 is defined by the drum 156, and it receives an annular piston 160. The inner periphery of drum 156 is splined to permit a splined connection with one or more externally splined clutch discs 162. Cooperating internally splined clutch discs 164 are carried drivably by an externally splined clutch member 166. A clutch pressure back-up plate 168 also is externally splined to the drum 156 and held axially fast by a snap ring 170.

Fluid pressure may be admitted to the working chamber defined by the piston 160 and the cylinder 158 through a pressure feed passage 172. This passage communicates with a radial port 174 which in turn communicates with a pressure distributor passage 176 formed in the extension 138.

Member 154 carries a spring back-up element 178, and piston return springs 180 are situated between element 178 and the piston 160. Piston 160 is formed with a centrifugal pressure bleed passage 182 at a radially outward location. It is adapted to exhaust residual fluid located within the cylinder 158 following disengagement of the clutch disc assembly. This avoids a pressure build-up due to the centrifugal effect. As the piston 160 moves into engagement with the adjacent clutch disc 164, however, passage 182 is blocked thereby permitting a pressure build-up to occur behind the piston 160 as pressure is introduced to the cylinder 158 through the passage 172.

Clutch member 166 is connected to the ring gear 184 of the planetary gear unit 14. This connection may be formed by means of splines or keys as indicated at 186. Ring gear 184 meshes with planet pinions 188 which are carried by pinion shafts 190. These shafts in turn are supported by planetary carrier 192.

Pinions 188 engage also a sun gear 194. The sun gear is common to the planetary gear units 12 and 14.

Planetary carrier 192 is supported upon member 154 by means of a bushing 196. It is connected to the power output shaft 122 by means of a splined connection that includes portions of the governor valve mechanism identified generally by reference character 198.

The governor valve mechanism includes a governor valve body 200 having a splined central opening 202. A sleeve shaft 204 is connected to carrier 192 and splined to the splined opening 202. The end of power output shaft 122 also is splined within the opening 202 thereby providing a direct drive connection between the carrier 192 and the power output shaft 122. Governor body 200 is connected to ring gear 206 for the planetary gear unit 12. A suitable torque transfer member 208 is provided for this purpose. Ring gear 206 meshes with planetary pinions 210 which are rotatably supported by pinion shafts 212. A carrier 214 carries the pinion shaft 212 and is keyed or otherwise directly connected to a brake drum 216. A low-speed ratio and reverse ratio brake band 218 surrounds brake drum 216 and may be applied and released by means of a fluid pressure operated servo of conventional construction. This servo is schematically represented in FIGURE 2B.

The common sun gear 194 is journaled upon sleeve shaft 204 by means of a bushing 220. Brake drum 216 carries a cammed overrunning brake race 222 which surrounds a stationary inner race 224. The inner race 224 is bolted by means of bolts 226 to the wall 110 of the housing portion 22. Overrunning brake elements in the form of rollers 228 are situated between the races 222 and 226 thereby providing a one-way braking action for the brake drum 216. Freewheeling one-way motion of the brake drum 216 relative to the housing structure can be accommodated, however, by the rollers 228.

A brake drum 230 is rotatably supported upon the extension 138 by means of a bushing 232. This brake drum defines an annular cylinder 234 within which is positioned an annular piston 236. Piston return springs 238 are situated between piston 236 and a spring seat member 240 which is held axially fast upon the hub of drum 230. Like the piston 160, the piston 236 is formed with a centrifugal pressure bleed passage 242 thereby preventing an undesirable centrifugal pressure build-up following release of fluid pressure from the cylinder 234. Fluid pressure is introduced into the cylinder 234 through passage 239 which communicates with a pressure feed passage 240 formed in the extension 138.

Drum 230 is surrounded by an intermediate speed ratio brake band 242. This brake band can be applied and released by means of a suitable fluid pressure operated servo that is schematically indicated in FIGURE 2B. The inner periphery of the drum 230 is splined as shown at 244 to permit a driving connection with externally splined clutch discs 246. Cooperating internally splined clutch discs 248 are carried by an externally splined clutch member 250. A clutch pressure back-up plate 252 is externally splined to the interior of the drum 230 and held axially fast by a snap ring 254.

Upon introduction of pressure to the cylinder 234, the second speed ratio clutch will establish a driving connection between drum 230 and clutch member 250. Similarly, when fluid pressure is admitted to the cylinder 158, a driving connection is established between drum 156 and clutch member 166. Drum 230 is drivably connected to the common sun gear 194 by means of a drive shell 256. The outer periphery of drive shell 256 is splined or keyed at 258 to one end of the drum 230. The inner margin of the shell 256 is splined to the sun gear 194 as indicated.

The valve body 200 of the governor valve mechanism 198 rotates within the stationary race 224. It is enclosed entirely within the inner confines of the low speed ratio and reverse ratio brake drum 216. Thus no additional length of the transmission assembly must be provided in order to accommodate the governor valve mechanism.

The transmission mechanism of FIGURE 1A and FIGURE 1B is adapted to establish three forward driving speed ratios and a single reverse speed ratio. To establish a low speed forward drive ratio, brake band 218 is applied, thereby anchoring carrier 214. The impeller of the hydrokinetic torque converter unit 16 is coupled directly to the engine so that a toroidal fluid flow in the torus circuit of the converter unit is established. Turbine torque then is delivered to shaft 86 and hence to clutch member 154. The forward clutch shown in part at 162 and 164 is engaged and the turbine torque then is transferred directly to the ring gear 184. The sun gear 194 tends to rotate in a backward direction relative to the direction of rotation of ring gear 184. This backward motion, however, causes a forward driving motion of ring gear 210 by reason of the fact that the carrier 214 forms a reaction element. The forward motion thus imparted to ring gear 210 then is transferred directly to the power output shaft 122 through the governor body 200.

The forward driving torque applied to the carrier 192 is transferred directly to the power output shaft through sleeve shaft 204. Thus the low speed ratio is characterized by a compounding of the two planetary gear units.

During normal forward driving, however, it is not necessary to engage brake band 218 since the overrunning brake 228 will provide the necessary torque reaction. But brake band 218 can be applied to establish a hill braking or coasting condition since the overrunning brake shown in part at 228 cannot accommodate reverse torque delivery to the transmission housing.

To establish intermediate speed ratio operation, it merely is necessary to engage intermediate speed ratio brake band 242 thereby anchoring sun gear 194. The sun gear 194 therefore acts as a reaction member and a forward driving torque then is delivered to the carrier 192 as the turbine drives the ring gear 184. The forward motion of the carrier 192, of course, is transferred as before to the power output shaft 122. Gear unit 212 is inoperative under these conditions and the overrunning brake shown in part at 228 will freewheel.

To establish direct drive high speed ratio operation, it merely is necessary to release brake band 242 and apply both clutches simultaneously. This locks together the planetary gear elements so that they rotate in unison at a 1-to-1 speed ratio.

Reverse drive operation is established by applying brake band 218 and applying the rearward clutch shown in part at 246 and 248. The other clutch is released and brake band 242 is released. Turbine torque then is delivered to clutch member 154 and transferred directly to the rear clutch structure and through the drive shell 256 to the sun gear 194. This causes the sun gear 194 to rotate in the direction of rotation of the impeller. Carrier 214, of course, is anchored by the brake band 218 and acts as a reaction member. Ring gear 206 then is driven in a reverse direction and its reverse motion is transferred directly to the power output shaft 122 at a reduced speed ratio.

Referring next to FIGURES 2A and 2B, we have illustrated in schematic form an automatic control valve system for controlling the operation of the clutches and brakes shown in FIGURE 2B. The pump that is indicated in FIGURE 2B by reference characters 142 and 150 is designated in FIGURE 2A by reference character 270. The pump is supplied by a fluid supply passage 272 that communicates with a transmission sump defined in part by an oil pan 274 at the lower portion of the transmission housing.

The control valve elements that comprise the system of FIGURES 2A and 2B are located in a valve body designated generally by reference character 276 in FIGURE 1B.

The high pressure side of the pump 270 communicates with a control pressure passage 278. The discharge pressure of pump 270 is maintained at a regulated value by a main regulator valve generally indicated by reference character 280. This valve includes a valve chamber 282 within which is slidably positioned a multiple land valve spool 284 having valve lands 286, 288, 290 and 292. Internal valve lands formed in the chamber 282 cooperate with the external valve spool lands. Spool 284 is biased in a left hand direction by a valve spring 294 which is seated upon a valve insert 296. A line pressure boost valve element 298 is slidably received with an opening 300 formed in the insert 296. It is adapted to engage a stem 302 formed on the valve spool 284.

Insert 296 includes also a smaller diameter opening 304 within which is situated a line pressure cut-back control valve element 306 which is adapted to engage the element 298.

Communication between passage 278 and chamber 282 normally is blocked by the valve land 292. A branch passage 308, however, is adapted to distribute pressure in passage 278 to the left hand side of valve land 286. This establishes a pressure force that acts in a right hand direction to oppose the influence of valve spring 294.

A converter pressure feed passage 310 communicates with the chamber 282 in the region of the land 290. As pressure in passage 278 begins to increase during initial operation of the engine, passage 310 will be uncovered by land 290 thereby permitting free communication between passage 278 and passage 310 through the branch passage 308 and through the annular space defined by the lands 288 and 290. Thus the converter is supplied with charging pressure through passage 310 after pressure has been developed in the control valve system. In the embodiment shown in FIGURES 1A and 1B, this passage 310 is defined by the annular space between turbine shaft 86 and the central pump drive shaft 146. It is distributed radially outwardly through radial grooves formed in a thrust washer 312 located between hub 82 and the inner portion 40 of the shell part 38. The fluid thus supplied then passes radially outwardly between the shell part 38 and the exterior of the shroud 72 for the turbine. It then enters the torus circuit at a radially outward location and circulates through the torus cavity. The flow is returned through the annular space located between the impeller shell part and the flow exit region of the stator shroud 92. It passes radially inwardly past spacer element 102 and then through a flow return passage 314 located in the shaft extension 58. The annular space defined by the power output sleeve shaft 122 and the turbine shaft 86 forms a portion of the converter flow return circuit. This annular space which is indicated in FIGURE 2A by reference character 316, communicates with transmission lubrication points such as the bearings.

A ball check pressure relief valve 318 communicates with passage 310 to prevent a pressure build-up in the converter that is greater than a safe value. Other lubrication points, such as the clutches, are supplied with lubricating fluid through a lubricating oil passage 320 which communicates with the passage 310. The lubricating oil pressure is maintained at a desired value by means of a ball check valve 322 which normally is spring biased to a closed position.

After the oil passes the various lubrication points in the transmission system, it is returned to the oil sump and recirculated through passage 272 and the pump 270. If desired, a cooler 324 can be provided in the fluid circuit in order to stabilize the operating temperature at a desired value.

Upon a continued increase in the pressure in passage 278 following initial operation of the engine, valve spool 284 will be moved to a point where land 292 establishes communication between passage 278 and a return passage 272. This by-passes a portion of the discharge fluid of the pump 270. Thus a further increase in the pressure will not take place. The magnitude of the ceiling for the regulated pressure is determined by the calibration of the spring 294. The effect of the spring, however, can be altered as will become apparent from subsequent portions of this description.

Passage 278 communicates directly with a passage 326. This passage in turn communicates with a manual valve 328 which is under the control of the vehicle operator.

Manual valve 328 includes a valve spool 330 having multiple lands 332, 334 annd 336. These are slidably situated within a valve chamber 338 which defines cooperating internal valve lands. Valve spool 330 can be moved to any one of four operating positions that are indicated by reference symbols HB, DR, N and R. These symbols respectively identify the positions corresponding to hill brake or low speed ratio operation, forward drive operation, neutral and reverse operation. When the valve spool 330 assumes the neutral position shown, land 334 blocks passage 326 thereby interrupting distribution of pressure to the valve system.

An exhaust port 340 communicates with the valve chamber 338 at a point intermediate valve lands 332 and 334. Each end of the chamber 338 also communicates with the exhaust region.

If the manual valve element is shifted to the forward drive range position DR, passage 326 is brought into communication with a passage 342 and valve land 336 will close the right hand end of the valve chamber 338. When the spool 330 is so positioned, passage 342 communicates directly with the servo for the low, intermediate and high rear clutch. It communicates also with a restricted passage 344 which extends to the one-two shift valve generally identified by reference character 346. This valve includes a multiple land valve spool 348 positioned within valve chamber 350. Spool 348 includes valve lands 352, 354, 356, 358 and 360. Each valve land registers with a cooperating internal valve land formed in the valve chamber 350.

The upper end of the valve land 352 is subjected to vehicle speed governor pressure through a passage 362. The differential area defined by the adjacent valve lands 352 and 354 is subjected to a reduced throttle pressure that is distributed thereto through a passage 364. When the magnitude of the governor pressure signal in passage 362 is sufficiently high to overcome the force created by the reduced throttle pressure in passage 364 and by the force of a valve spring 366, the spool 348 is shifted in a downward direction. Spring 366 acts directly upon the spool 348 and is seated upon the lower end of the valve chamber 350. When this shift occurs, land 354 blocks an exhaust passage 368 and land 356 uncovers passage 344. Communication then is established between passage 344 and a passage 370 which in turn communicates with the pressure apply chamber of the rear brake band servo through the pressure passage 372. Communication between passage 344 and passage 370 is established by the annular space between lands 354 and 356. When the valve spool 348 assumes the upper position, however, passage 370 is exhausted through exhaust port 368.

When the manual valve 330 assumes the forward drive position DR, communication is established between exhaust port 340 and a hill-brake pressure passage 374. This passage in turn communicates with the passage 376 which extends to the valve chamber 350 at a point intermediate valve lands 356 and 358. If the valve spool 348 assumes the upper position, passage 376 communicates through the valve chamber 350 with a passage 378 which communicates with the servo for the reverse and low front brake band. Passage 378 therefore is exhausted through the port 340 in the manual valve.

The lower end of the valve land 360 is in fluid communication with passage 378.

Passage 370 and the apply side of the intermediate rear brake band servo communicate with a cut-back control valve 380 through a passage 383. This valve comprises a single diameter valve chamber 382 within which is positioned a single diameter valve element 384. Element 384 normally is urged in an upward direction by a valve spring 386 situated between element 384 and a plunger 388 located at the lower end of the chamber 382. The lower end of the plunger 388 is in fluid communication with passage 374 through a branch passage 390.

The cut-back pressure passage 392 communicates with the main regulator valve 280 and distributes pressure to the differential area defined by the valve lands 286 and 288 on the valve spool 284. Passage 292 communicates with chamber 382 at a location below element 384 and also at a location adjacent the upper end of the chamber 382. Spring 386 is calibrated so that a pressure differential will be maintained between the pressure in passage 383 and the pressure in passage 392. A minimum throttle pressure may be maintained, therefore, since a cut-back in the pressure will not take place if the pressure maintained in the system is less than that which is required by the minimum throttle conditions. In a preferred embodiment of our invention, this differential may be approximately 50 p.s.i.

An exhaust port 394 communicates with the chamber 382 so that pressure regulation can take place.

If the manual element 330 is shifted to the hill-brake position HB, land 334 will block a branch passage 396 leading to the passage 374 and will establish communication between passage 326 and passage 374. Thus passage 374 becomes pressurized. If the one-two shift valve spool 348 assumes an upward position, this pressure will be distributed directly through valve chamber 350 to the passage 378, thereby, applying the front brake band. On the other hand, if the shift valve spool 348 assumes a downward position, passage 376 is blocked by land 356 and passage 378 will be exhausted through exhaust port 398 formed in the chamber 350. Thus a shifting movement of the manual valve to the hill-brake position will have no immediate effect upon the front brake band servo. The servo will respond only after the one-two shift valve is returned to the down-shift position shown in FIGURE 2B.

As passage 374 is pressurized, the right hand end of valve element 306 in the regulator valve assembly is pressurized. This augments the force of the spring 294 which acts upon the valve spool 284 thereby increasing the magnitude of the circuit pressure. Such an increase in pressure is required in order to maintain the necessary capacity of the clutch and brake servos during operation in the low speed ratio hill-brake range. Pressure in passage 374 is distributed also to the lower end of the plunger 388, thereby shifting it upwardly to block communication between passage 392 and passage 382 while simultaneously establishing communication between passage 392 and exhaust port 394. Since the pressure force acting upon the differential area of valve lands 286 and 288 then is dropped, a further augmentation in the circuit pressure is achieved.

During operation in the hill-brake range, the one-two shift valve will upshift from the low speed ratio position to the intermediate speed ratio position in a normal fashion in response to changes in the magnitude of the governor pressure in passage 362 and the reduced throttle pressure in passage 364. Once a shift to the low speed ratio position is achieved, however, communication is established immediately between passage 376 and passage 378 thereby permitting the front brake band to become applied. The same pressure in passage 378 then is distributed to the lower end of the valve land 360. This locks the valve spool 348 in a low speed ratio position as indicated in FIGURE 2B and prevents further upshifts. Operation in the low speed ratio then is continued as long as the manual valve assumes the hill-brake position.

The relationship between the manual valve, the one-two shift valve and the front brake band servo provides an inherent low speed inhibiting action that will prevent shifting to the low speed ratio when the vehicle speed is greater than a safe value. Such a shift can be accomplished manually by the operator only after a normal two-one downshift occurs. This downshift does not occur, however, until the vehicle is traveling at a speed that is sufficiently low to make such a transition to the lower speed ratio safe.

The two-three shift valve controls distribution of pressure to the front clutch and the release side of the rear brake band servo to accomplish a two-three upshift. This valve is designated generally by reference character 400. It includes a valve spool 402 and multiple valve lands 404, 406, 408 and 410. The upper end of valve land 410 is subjected to a vehicle speed governor pressure that is distributed thereto through the passage 362 which is common to the one-two shift valve. This governor pressure is opposed by the force of a valve spring 412 situated between valve land 404 and a throttle pressure reducer valve 414. This reducer valve is located at the lower end of the two-three shift valve chamber 416 within which the valve element 404 is positioned.

Reducer valve element 414 includes two lands of different diameters. These are identified by reference characters 418 and 420. Throttle pressure boost valve output pressure is distributed to the lower end of the land 414 through a passage 422. The spring 412 functions to reduce the magnitude of the pressure in passage 422 before it is made available to a reduced throttle pressure passage 424. This passage 424 communicates with the lower end of valve land 404 on the two-three shift valve as well as with the passage 364 leading to the upper end of the one-two shift valve. The magnitude of the pressure in passage 424 is determined by the calibration of the spring 412 as well as by the diameters of the valve lands 418 and 420.

The front clutch receives its pressure through passage 176 as indicated previously. This passage communicates with passage 426 which communicates in turn with the valve chamber 416 intermediate the valve lands 406 and 404. When the valve spool 402 is in the position hsown, communication is established through the valve chamber 416 between passage 426 and the passage 428. This passage 428 in turn extends to the manual valve and is in communication with exhaust port 340 except when the manual valve assumes the reverse R position. A restriction 430 is situated in the passage 428 to cushion the release of the front clutch and the application of the rear brake band servo.

When the manual valve assumes the forward drive position DR, passage 432 is pressurized. This passage communicates with the manual valve chamber 338 at a point intermediate the lands 334 and 336 and receives its pressure from passage 326. It communicates also with a branch passage 434 which extends to the chamber 416 adjacent valve land 404. Passage 434 is formed with a flow restricting orifice 436.

The diameter of land 408 is slightly larger than the diameter of land 406. Thus when the spool 402 assumes the position shown in FIGURE 2B, a pressure force will be exerted upon it to supplement the force of the spring 412. This delays an automatic upshift. If desired, a second valve spring 438 can be added to supplement the action of spring 412.

When the vehicle speed reaches a sufficiently high value for any given magnitude of the reduced throttle pressure in passage 424, spool 402 will shift in a downward direction thereby interrupting communication between passage 426 and the exhaust passage 428 and establishing communication between passage 426 and the pressurized passage 434. This causes pressure to be distributed to passage 176 thereby applying the front clutch. The pressure in passage 176 also is distributed to a passage 440 through a one-way check valve 442. Passage 440 in turn extends to the release side of the rear brake band servo. When both sides of the servo are pressurized, the rear brake band is released. A parallel branch passage 444 interconnects passage 440 and passage 176. Passage 444 communicates with an orifice control valve chamber 446 within which is positioned a double land valve spool 448. This spool includes valve lands 450 and 454 which are urged in a left hand direction by an orifice control valve spring 456. A flow restricting orifice 458 is located in passage 444. A relatively unrestricted passage 451 is situated in parallel relationship with respect to the orifice 458.

The left hand side of the land 454 is subjected to the throttle valve pressure that is distributed to the orifice control valve through a throttle valve pressure passage 452. During normal operation of the mechanism under torque, a sufficient pressure exists in passage 452 to overcome the influence of spring 456. Thus passage 450 communicates directly with passage 444. When the vehicle is coasting, however, or when it is operating under minimum throttle conditions, the orifice control valve spool 458 will shift under the influence of spring 456 in a left hand direction. If a downshift then occurs from the high speed ratio in the intermediate speed ratio, fluid will be exhausted from the release side of the rear brake band servo through passage 440 and through the restriction 458. It then passes through passage 426 to the exhaust passage 428 through the shift valve chamber 416 after the shift valve spool 402 assumes the downshift position shown in FIGURE 2B. The presence of the orifice 458 then will retard the application of the rear brake band with respect to the time required to release the front clutch. Such a delaying action eliminates the harshness of the zero throttle downshift.

The throttle pressure is obtained by means of a throttle valve generally identified by reference character 460. It includes a valve spool 462 having valve lands 464 and 466 which are received within a valve chamber 468 having internal valve lands.

Control pressure from the pump 270 is distributed to valve chamber 468 through a passage 470. An exhaust port 472 also communicates with the chamber 468.

Spool 462 is acted upon by a vacuum servo motor 474. This motor includes a housing 476 which defines a pressure cavity 478. A flexible diaphragm 480 is received over one end of the housing 476. A spring 482 is disposed between the diaphragm 480 and the housing 476 thereby tending normally to urge the diaphragm 480 in a right hand direction. The net force acting upon the diaphragm 480 is transmitted to the throttle valve spool 462 through a valve stem 484.

The interior of pressure chamber 478 communicates with the engine fuel-air mixture intake manifold through a suitable manifold pressure passage 486. The pressure in chamber 478 thus corresponds to the pressure that exists in the engine manifold on the downstream side of the air-fuel mixing carburetor apparatus for the engine.

The pressure in passage 452 acts upon the right hand end of valve land 466, a suitable restricted passage 488 being provided for this purpose. Valve spool 462 thus will modulate the pressure in passage 470 to produce a resultant pressure in passage 452 that is an indicator of the engine intake manifold pressure which in turn is related functionally in magnitude to the engine power. If the engine power is low, the magnitude of the pressure in passage 452 is reduced correspondingly.

A branch passage 490 distributes pressure from passage 452 to the right hand side of valve element 298 in the regulator valve assembly. Thus as the engine torque increases, the magnitude of the pressure maintained by the main regulator valve assembly in increased since the pressure force acting upon element 298 supplements the action of the spring 294.

The pressure in passage 452 is distributed also to a boost valve which is indicated generally by the reference character 492. This valve includes a valve spool 494 having valve lands 496 and 498, the diameter of land 496 being greater than the diameter of land 498. Spool 494 is urged in a left hand direction by a valve spring 500.

As the engine intake manifold pressure increases beyond a median range of values, it no longer may be relied upon as an indicator of torque demand for purposes of establishing the shift points for the one-two shift valve and the two-three shift valve. The boost valve therefore is called upon to augment the manifold pressure sensitive signal in passage 452. This is accomplished by distributing pressure from passage 452 to the left hand side of land 496 through a passage 502. When the valve spool 494 assumes a left hand position under the influence of spring 500, direct communication is established between passage 502 and the boost valve pressure passage 422. Thus the magnitude of the pressure in passage 422 equals the magnitude of the pressure in passage 452. As the manifold pressure increases beyond a mid range of values, however, valve spool 494 will be urged in a right hand direction against the spring 500. At a predetermined point control pressure passage 504 begins to be uncovered by land 498. Passage 504, of course, in turn is supplied with control pressure from passage 278. Thus the degree of communication between passage 502 and passage 422 decreases progressively while the degree of communication between passage 504 and passage 422 increases progressively. This results in an augmentation in the magnitude of the pressure in passage 422 so that it exceeds the pressure in passage 452. A subsequent increase in torque demand by the vehicle operator will not necessarily result in a proportional increase in the pressure in passage 452, but it will result in a significant increase in the pressure in passage 422. This then delays the upshift points to a desired value, as the vehicle accelerates with advance engine throttle settings.

The signal in passage 422 is controlled by the reducer valve 414 as explained previously. The same reducer valve is used for distributing a common pressure to each of the two shift valves. It controls in this way both the one-two shift point and the two-three shift point.

The particular design of the reducer valve of this system results in a greater reduction in the boost valve output pressure at low values of the throttle pressure and a smaller reduction at higher values of the throttle pressure. This introduces flexibility in establishing the shift points that would not otherwise be available. The area of the valve land 420 can be controlled in order to establish the proper part throttle downshift points. The calibration of the springs 412 and 438 can be controlled also to produce a proper light throttle upshift point.

As the two-three shift valve spool 402 is shifted to the upshift position, the passage 432 becomes blocked while land 408 and the annular space between lands 406 and 408 becomes exhausted through exhaust passage 428. Thus the pressure that previously acted upon the differential area of valve lands 406 and 408 no longer is available. This introduces a so-called hysteresis effect which controls the relationship between the light throttle upshifts and the zero throttle downshifts. Once an upshift has occurred for any given magnitude of the throttle pressure, a corresponding downshift for that same throttle pressure will not occur until after the governor pressure is reduced to a value that is less than the value at which the upshift occurred initially. The hysteresis effect also produces a desirable snap action during a shift of the valve spool 402.

It is possible to overrule the automatic operation of the shift valves by means of a downshift control system. This includes a downshift detent valve 506 and a kick-down limit valve 508. Valve 506 includes a valve spool 510 having spaced valve lands 512 and 514 which are located within a downshift detent valve chamber 516. An exhaust port 518 communicates with the chamber 516.

The kick-down limit valve comprises a valve spool 520 having spaced valve lands 522 and 524. These are located within a valve chamber 526. Exhaust port 528 communicates with the chamber 526. Spool 520 normally is urged in a right hand direction by a valve spring 530.

Chamber 526 normally is supplied with control pressure from the passage 326. This passage is in communication with passage 532 which extends to the right hand side of the valve land 514 of the downshift detent valve. A restriction 534 is provided in this passage. A downshift detent valve output pressure passage 536 communicates with the chamber 516 intermediate the lands 512 and 514. Passage 536 in turn communicates with the lower end of the two-three shift valve chamber 416 intermediate the reducer valve lands 418 and 420.

The downshift detent valve may be connected mechanically to the engine vehicle carburetor throttle valve. It normally assumes the position shown in FIG. 2A. As the vehicle operator advances the engine carburetor throttle valve past a detent position to its maximum setting, however, spool 510 will be shifted in a right hand direction thereby establishing communication between passage 532 and passage 536. The pressure made available to passage 532 by the kick-down limit valve then is transferred to passage 536 and to the reducer valve. The reducer valve is shifted in a downward direction thereby establishing direct communication between passage 536 and the lower end of the valve land 404 as well as the lower end of the valve land 352. This tends to produce a forced downshift of each of the two shift valves. Such a downshift will occur whenever the governor pressure is reduced to a value at which its influence will be overcome by the opposing influence of the downshift detent valve pressure.

Passage 532 communicates with the right hand side of the kick-down limit valve land 524. This then causes valve spool 520 to modulate the control pressure made available to it through passage 326. The modulated pressure then is made available to downshift detent valve. This reduces the advanced throttle one-two shift valve point to a value that is more desirable than that value that would exist if fluid control pressure were made available to the downshift detent valve. The through detent one-two shift point then can be controlled by appropriately controlling the characteristics of the kick-down limit valve without adversely influencing any of the other control variables in the circuit.

As previously explained, the orifice 430 controls the rate of release of the front clutch during a high to intermediate downshift. During a forced downshift through the medium of downshift detent valve, however, the influence of the orifice 430 is modified as the valve spool 402 is returned to the downshift position. When such a through detent downshift occurs, orifice 534 in the feed passage for the downshift detent valve pressure passage 536 is introduced. As pressure is applied to a differential area of lands 418 and 420, the reducer valve moves downward. This is accompanied, of course, by an upward movement of valve spool 402. The fluid volume in the region of the chamber 416 between lands 404 and 418 thus increases. The increased volume is supplied with oil through the orifice 534. Thus the orifice 534 retards the rate of expansion of this volume and hence the rate at which the shift valve is returned to the downshift position is reduced accordingly. Therefore, the influence of the orifice 430 is gradually increased so that the total time that is required for release of the front clutch is increased under these conditions. This provides a smooth transition from the high speed ratio to the low speed ratio and the degree of overlap between clutch release and brake application is modified to suit the changed requirements imposed by the through detent downshift.

The governor pressure signal is obtained by means of a governor valve assembly identified, as previously indicated, by reference character 198. It includes a governor body 200 which is connected to the power output shaft. Body 200 includes a first valve opening 538 within which is positioned a low-speed valve element 540. An orifice plate 542 closes the radially outward end of the opening 538 and is provided with a flow restricting orifice 544. The radially outward end of element 540 is coned so that it registers with the orifice 544. An exhaust port 546 communicates with the radially outward region of the opening 538.

The body 200 is provided also with a high speed valve opening 548 within which is situated a ball valve 550. This ball valve is urged normally in a radially outward direction by a valve spring 552. Another orifice plate 554 closes the radially outward end of opening 548 and is provided with a relatively large diameter orifice 556. An exhaust port 558 communicates with a radial outward region of the opening 548. The ball valve 550 registers with the orifice 556.

Sealing rings 560 and 562 are situated on either axial side of the valve openings 538 and 548.

The race 224 is formed with an annular groove 564 which surrounds the body 200. This groove communicates with a governor feed passage 566 which in turn communicates with passage 342 through a flow restricting orifice 568. Passage 342 is exhausted whenever the manual valve element 330 is shifted to the neutral position or the reverse drive position. It is pressurized, however, whenever the valve element 330 is shifted to either of the forward drive positions DR or HB. Thus the feed to the governor is interrupted whenever the control system is conditioned for neutral or reverse drive operation. This avoids unnecessary loss of fluid through the governor mechanism.

The pressurized fluid in passage 566 is exhausted through the two orifices 544 and 556. Orifice 536, however, normally is closed when the vehicle speed is relatively low. As the power output shaft begins to rotate, valve element 540 is urged into registry with the orifice 544 thereby tending to increase the restriction between passage 566 and the exhaust port 546. As the speed increases, the back pressure in passage 566 increases. This in turn results in an increase in pressure in the passage 362, the latter communicating directly with the passage 566 as indicated. This back pressure is utilized as a pressure signal that is an indicator of the vehicle speed.

The presence of the orifice 568 preserves line pressure in the system during operation of the governor mechanism. It provides sufficient feed, however, for the governor to enable it to develop a back pressure in passage 566.

As the speed increases, the back pressure becomes sufficient to unseat ball valve element 558 thereby introducing a second orifice into the system. During operation of the governor mechanism at high speeds, both governor valves then are effective to create a back pressure in passage 566.

In order to provide sufficient feed for the governor mechanism during operation at high speeds, a governor transition valve is introduced into the system. This is identified by reference character 570. It includes a valve element 572 having a pair of valve lands 574 and 576 which are situated within a valve chamber 578. Spool 572 normally is urged in a left hand direction by a valve spring 580.

A branch passage 582 communicates with passage 342 on the up-stream side of the restriction 568. This passage normally is blocked by land 576 when the spool 572 assumes a left-hand position. When the spool 572 assumes a right-hand position, however, passage 582 is brought into communication with another branch passage 584 which has a second restriction 586. Thus restriction 586 and restriction 568 are brought into parallel relationship to increase the rate of supply of oil to the passage 566.

Land 574 is subjected to the pressure in passage 566 and the spool 572 shifts in a right hand direction as the pressure in passage 576 increases to a value greater than a predetermined value. At this time both orifices are available to supply the governor mechanism. This permits the governor to have sufficient oil to develop a pressure that more closely approaches the line pressure in the control system. During operation of the governor mechanism at low speeds, however, valve spool 572 is shifted in a left-hand direction so that only orifice 568 is available to feed the governor mechanism. This restricts the flow of oil through the governor mechanism and permits the governor signal to more closely approach a value of zero. The range of values that can be obtained by the governor mechanism thus is increased so that a more useful speed signal will be available. This simplifies the problem of establishing the shift points and provides greater flexibility in designing the transmission mechanism for optimum shift quality.

During operation of the transmission mechanism in a low speed ratio under initial starting conditions, the torque ratio of the converter is at or near its maximum value. The combined effect of the converter torque ratio and the maximum torque ratio made available by the gear system makes it necessary to increase the torque transmitting capacity of the servos. Thus the main regulator valve is designed to establish a relatively high value during operation in the low speed ratio range. This value is higher than that which would be desired during operation in higher speed ranges where the torque converter does not develop its maximum torque ratio. For this reason the main regulator valve pressure is cut-back by introducing the pressure to passage 382 upon an upshifting movement of the 1–2 shift valve. Normally passage 382 is exhausted through port 368 as explained previously. However, upon a 1–2 upshift passage 382 becomes pressurized as passage 370 is brought into communication with passage 344. This produces a pressure in passage 382 and a reduced pressure in passage 392, as explained previously. The 1–2 shift valve therefore forms a part of the pressure regulating valve system as well as a part of the servo pressure distributor system.

Having thus described a preferred embodiment of our invention, what we claim and desire to secure by U.S. Letters Patent is:

1. In a power transmission mechanism adapted to deliver torque from a driving member to a driven member, a planetary gear system comprising a housing, planetary gear elements mounted within said housing, a power input element of said gear system being connected to said driving member, a power output element of said gear system being connected to said driven member, selectively engageable clutch means for connecting together two elements of said gear system for rotation in unison thereby conditioning said system for operation in a relatively high speed ratio, brake means for anchoring another portion of said gear system against said housing to provide a torque reaction thereby conditioning said system for operation in a relatively low speed ratio, fluid pressure operated servos for actuating said clutch means and said brake means, a fluid pressure pump drivably connected to a torque delivery member of said gear system, an automatic control valve means in fluid communication with said pump for supplying selectively fluid pressure to said servos, said control valve means including a governor valve mechanism drivably connected to said driven member including a governor pressure signal passage, said governor pressure signal passage communicating with said control valve means and being adapted to distribute pressure to said governor valve mechanism, a governor transition valve in said signal passage comprising a fluid flow restricting branch passage in parallel relationship with respect to said signal passage, a transition valve chamber situated in said branch passage, a movable transition valve element in said transition valve chamber having two operating positions, spring means for normally urging said transition valve element to a first position to block said branch passage, said signal passage communicating with said transition valve chamber whereby the pressure in said signal passage acts upon said transition valve element to uirge it to its other position thereby opening said branch passage, said brake means including a stationary sleeve connected to said housing and disposed within said drum, a governor valve body connected to said driven member and rotatably mounted within said sleeve, two flow restricting orifices formed in said valve body, separate centrifugally responsive valve elements of different mass adapted to register with each orifice and restrict the same to a degree that is dependent upon the speed of rotation of said driven member, one side of each of said orifices communicating with the signal passage and the other side thereof communicating with the exhaust region.

2. In a power transmission mechanism for delivering power from a driver controlled engine to a driven shaft, two fluid pressure operated servo means for controlling the relative motion of torque delivery elements of said mechanism, a fluid pressure source, conduit structure including separate portions extending from said source to each servo means, separate fluid pressure distributor valve means disposed in and partly defining each conduit structure portion, governor valve means for producing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding to increasing driven shaft speed for any given driver demand for engine torque to condition said servos for speed ratio shifts from a low speed ratio to an intermediate speed ratio and from said intermediate speed ratio to a high speed ratio respectively, regulator valve means for maintaining a predetermined operating pressure level for said servos, said one distributor valve means being in fluid communication with portions of said regulator valve means and adapted to control distribution of pressure thereto in response to shifting movement of its movable portions to an intermediate speed ratio position to cause a decrease in effective pressure maintained by said regulator valve means, and cutback control valve means in fluid communication with said one distributor valve means and with said regulator valve means for modifying the influence of the former upon the latter whereby a reduction in the magnitude of pressure maintained by said regulator valve means is accomplished only when the effective pressure developed by said source is greater than a predetermined value.

3. In a power transmission mechanism adapted to deliver power from a driver controlled engine to a driven shaft, two fluid pressure operated servo means for controlling the relative motion of torque delivery elements of said mechanism, a fluid pressure source, conduit structure interconnecting said mechanism, a fluid pressure source, conduit structure including separate portions extending from said source to each servo means, separate fluid pressure distributor valve means disposed in and partly defining each conduit structure portion, governor valve means for producing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding to increasing driven shaft speed for any given driver demand for engine torque to condition said servos for speed ratio shifts from a low speed ratio to an intermediate speed ratio and from said intermediate speed ratio to a high speed ratio respectively, regulator valve means for maintaining a predetermined operating pressure level for said source, said regulator valve means including a fluid pressure area, a fluid passage extending from said one distributor valve means and pressurized upon shifting movement of the latter to an intermediate speed ratio position whereby said regulator valve means is conditioned for maintaining a lower operating pressure level than that which exists during low speed ratio operation, and cut-back control valve means in fluid communication with said one distributor valve means and with said regulator valve means for modifying the influence of the former upon the latter whereby the reduction in the magnitude of pressure maintained by said regulator valve means is accomplished only when the effective pressure developed by said source is greater than a predetermined value.

4. A power transmission mechanism adapted to deliver driving power from a driver controlled engine to a driven shaft, planetary gear elements forming in part plural torque delivery paths between said engine and said driven shaft, selectively engageable clutch means for connecting together for rotation in unison two elements of said gear system whereby said mechanism is conditioned for high speed ratio operation, selectively engageable brake means for anchoring one element of said gear system whereby an intermediate speed ratio is established, a fluid pressure operated clutch servo for operating said clutch means, a fluid pressure operated brake servo for operating said brake means including brake apply portions and brake release portions, said brake release portions being in fluid communication with the servo for said clutch means, a fluid pressure source, conduit structure interconnecting said source and said servo means including separate portions extending to the servo for said clutch means and to the brake apply portions of the servo for said brake means, separate fluid pressure distributor valve means disposed in and partly defining each conduit structure portion, governor valve means for producing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding respectively to increasing driven shaft speed for any given driver demand for engine torque to condition said servos for speed ratio shifts from the low speed ratio to an intermediate speed ratio and from an intermediate speed ratio to a high speed ratio upon distribution of pressure to the apply portions of the servo for said brake means and to the servo for said clutch means respectively, regulator valve means for maintaining a predetermined operating pressure level for said source, said one distributor valve means being in fluid communication with portions of said regulator valve means and adapted to control distribution of pressure thereto in response to shifting movement of its movable portions to an intermediate speed ratio position to cause a decrease in the effective pressure maintained by said regulator valve means, and cut-back control valve means in fluid communication with said one distributor valve means and with said regulator valve means for modifying the influence of the former upon the latter whereby the reduction in the magnitude of pressure maintained by said regulator valve means is accomplished only when the effective pressure developed by said source is greater than a predetermined value.

5. A power transmission mechanism adapted to deliver driving power from a driver controlled engine to a driven shaft, planetary gear elements forming in part plural torque delivery paths between said engine and said driven shaft, selectively engageable clutch means for connecting together for rotation in unison two elements of said gear system whereby said mechanism is conditioned for high speed ratio operation, selectively engageable brake means for anchoring one element of said gear system whereby an intermediate speed ratio is established, a fluid pressure operated clutch servo for operating said clutch means, a fluid pressure operated brake servo for operating said brake means including brake apply portions and brake release portions, said brake release portions being in fluid communication with the servo for said clutch means, a fluid pressure source, conduit structure interconnecting said source and said servos including separate portions extending to the servo for said clutch means and to the brake apply portion of the servo for said brake means, separate fluid pressure distributor valve means disposed in or partly defining each conduit structure portion, governor valve means for producing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding to increasing driven shaft speed for any given driver demand for engine torque to condition said servos for speed ratio shifts from the low speed ratio to an intermediate speed ratio and from an intermediate speed ratio to a high speed ratio upon distribution of pressure to the apply portions of the servo for said brake means and to the servo for said clutch means respectively, regulator valve means for maintaining a predetermined operating pressure level for said source, said regulator valve means having formed thereon an auxiliary pressure area, an auxiliary passage interconnecting said auxiliary pressure area and the apply portion of the servo for said brake means whereby the effective control pressure made available by said regulator valve means is reduced upon application of said brake means, and cut-back control valve means in fluid communication with said one distributor valve means and with said regulator valve means for modifying the influence of the former upon the latter whereby the reduction in the magnitude of pressure maintained by said regulator valve means is accomplished only when the effective pressure developed by said source is greater than a predetermined value.

6. In a power transmission mechanism for delivering power from a driver controlled engine to a driven shaft, two fluid pressure operated servo means for controlling the relative motion of torque delivery elements of said mechanism, a fluid pressure source, conduit structure including separate portions extending from said source to each servo means, separate fluid pressure distributor valve means disposed in and partly defining each conduit structure portion, governor valve means for producing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding to increasing driven shaft speed for any given driver demand for engine torque to condition said servos for speed ratio shifts from a low speed ratio to an intermediate speed ratio and from said intermediate speed ratio to a high speed ratio respectively, regulator valve means for maintaining a predetermined operating pressure level for said servos, said one distributor valve means being in fluid communication with portions of said regulator valve means and adapted to control distribution of pressure thereto in response to shifting movement of its movable portions to an intermediate speed ratio position to cause a decrease in effective pressure maintained by said regulator valve means, and cut-back control valve means in fluid communication with said one distributor valve means and with said regulator valve means for modifying the influence of the former upon the latter whereby the reduction in the magnitude of pressure maintained by said regulator valve means is accomplished only when the effective pressure developed by said source is greater than a predetermined value, driver operated valve means in fluid communication with said source for distributing pressure directly to said distributor valve means and said cut-back control valve means for overruling the influence of each whereby said gear system is conditioned for continuous operation in said low speed ratio and the pressure cut-back signal supplied by said one distributor valve means to said regulator valve means is rendered ineffective.

7. In a power transmission mechanism adapted to deliver power from a driver controlled engine to a driven shaft, two fluid pressure operated servo means for controlling the relative motion of torque delivery elements of said mechanism, a fluid pressure source, conduit structure including separate portions extending from each source to each servo means, separate fluid pressure distributor valve means disposed in and partly defining each conduit structure portion, governor valve means for producing a fluid pressure signal that is proportional in magnitude to driven shaft speed, throttle valve means for producing a second pressure signal that is proportional in magnitude to an engine power factor, branch passage means for subjecting movable portions of said distributor valve means to said signals for actuating them, one distributor valve means and the other distributor valve means responding to increasing driven shaft speed for any given driver demand for engine torque to condition said servos for speed ratio shifts from a low speed ratio to an intermediate speed ratio and from said intermediate speed ratio to a high speed ratio respectively, regulator valve means for maintaining a predetermined operating pressure level for said source, said regulator valve means including a fluid pressure area, a fluid passage extending from said one distributor valve means and pressurized upon shifting movement of the latter to an intermediate speed ratio position whereby said regulator valve means is conditioned for maintaining a lower operating pressure level than that which exists during low speed ratio operation, and cut-back control valve means in fluid communication with said one distributor valve means and with said regulator valve means for modifying the influence of the former upon the latter whereby the reduction in the magnitude of pressure maintained by said regulator valve means is accomplished only when the effective pressure developed by said source is greater than a predetermined value, driver operated valve means in fluid communication with said source for distributing pressure directly to said distributor valve means and said cut-back control valve means for overruling the influence of each whereby said gear system is conditioned for continuous operation in said low speed ratio and the pressure cut-back signal supplied by said one distributor valve means to said regulator valve means is rendered ineffective.

8. In a power transmission mechanism for delivering power from a driver controlled engine to a driven shaft, fluid pressure operated servo means for controlling the relative motion of torque delivery elements of said mechanism, a fluid pressure source, conduit structure interconnecting said source and said servo means and including separate portions extending to each of two servo means, separate fluid pressure distributor valve means disposed in and partly defining each conduit structure portion, governor valve means for providing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them including an auxiliary passage extending from said throttle valve means to each distributor valve means, a throttle pressure reducer valve means located in said auxiliary passage for producing a reduced throttle pressure including a valve element having valve lands of differential diameter, said second pressure signal acting upon said valve element whereby the shift points for said distributor valve means can be established at a desired value, and driver operated downshift detent valve means forming in part a fluid connection between said source and a differential area defined by said lands for overruling the influence of said second pressure signal in response to a maximum driver demand for engine torque, and kick-down limit valve means disposed in a portion of said conduit structure between said detent valve means and said source for modulating the kick down pressure made available to said detent valve means whereby a desired upshift point is established during operation with maximum driver demand for engine torque, said kickdown limit valve means comprising a valve chamber and a regulator valve element in said chamber, said chamber defining in part said last-named conduit structure portion whereby said regulator valve element modifies the kickdown pressure.

9. In a power transmission mechanism for delivering power from a driver controlled engine to a driven shaft, fluid pressure operated servo means for controlling the relative motion of torque delivery elements of said mechanism, a fluid pressure source, conduit structure interconnecting said source and said servo means and including separate portions extending to each of two servo means, separate fluid pressure distributor valve means disposed in and partly defining each conduit structure portion, governor valve means for providing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them including an auxiliary passage extending from said throttle valve means to each distributor valve means, a throttle pressure reducer valve means located in said auxiliary passage for producing a reduced throttle pressure including a valve spool having valve lands of differential diameter, said second pressure signal acting upon said spool whereby the shift points for said distributor valve means can be established at a desired value, and driver operated downshift detent valve means forming in part a fluid connection between said source and a differential area defined by said lands for overruling the influence of said second pressure signal in response to a maximum driver demand for engine torque, kickdown limit valve means disposed in a portion of said conduit structure between said detent valve means and said source for modulating the kickdown pressure made available to said detent valve means whereby a desired upshift point is established during operation with maximum driver demand for engine torque, said kickdown limit valve means comprising a valve chamber and a regulator valve element in said chamber, said chamber defining in part said last-named conduit structure portion whereby said regulator valve element modifies the kickdown pressure, and a flow control orifice in said last-named conduit structure portion for reducing the rate of distribution of pressurized fluid to said distributor valve means to compensate for the displacement of said movable portion of said distributor valve means upon a downshift.

10. In a power transmission mechanism for delivering power from a driver controlled engine to a driven shaft, fluid pressure operated servo means for controlling the relative motion of torque delivery elements of said mechanism, a fluid pressure source, conduit structure interconnecting said source and said servo means and including separate portions extending to each of two servo means, separate fluid pressure distributor valve means disposed in and partly defining each conduit structure portion, governor valve means for providing a first pressure signal that is proportional in magnitude to driven shaft speed, throttle valve means for producing a second pressure signal that is proportional in magnitude to an engine power factor, branch passage means for subjecting movable portions of said distributor valve means to said signals for actuating them including an auxiliary passage extending from said throttle valve means to each distributor valve means, a throttle pressure reducer valve means located in said auxiliary passage for producing a reduced throttle pressure including a valve spool having valve lands of differential diameter, said second pressure signal acting upon said spool whereby the shift points for said distributor valve means can be established at a desired value, driver operated downshift detent valve means forming in part a fluid connection between said source and a differential area defined by said lands for overruling the influence of said second pressure signal in response to a maximum driver demand for engine torque, kickdown limit valve means disposed in a portion of said conduit structure between said detent valve means and said source for modulating the kickdown pressure made available to said detent valve means whereby a desired upshift point is established during operation with maximum driver demand for engine torque, said kickdown limit valve means comprising a valve chamber and a regulator valve element in said chamber, said chamber defining in part said last-named conduit structure portion whereby said regulator valve element modifies the kickdown pressure, a flow control orifice in said last-named conduit structure portion for reducing the rate of distribution of pressurized fluid to said distributor valve means to compensate for the displacement of said movable portion of said distributor valve means upon a downshift, and a hydraulic connection between said regulator valve element and said throttle valve means for modifying the regulating action of said regulator valve element by increasing the kickdown pressure upon an increase in said second pressure signal.

11. In a power transmission mechanism adapted to deliver torque from a driving member to a driven member, a planetary gear system comprising a housing, planetary gear elements mounted within said housing, a power input element of said gear system being connected to said driving member, a power output element of said gear system being connected to said driven member, selectively engageable clutch means for connecting together two elements of said gear system for rotation in unison thereby conditioning said system for operation with a high speed ratio, brake means for anchoring another portion of said gear system against said housing to provide a torque reaction thereby conditioning said system for operation with a relatively low speed ratio, fluid pressure operated servos for actuating said clutch means and said brake means, a fluid pressure pump drivably connected to a torque delivery member of said gear system, an automatic control valve means in fluid communication with said pump for supplying selectively fluid pressure to said servos, said control valve means including a governor valve mechanism drivably connected to said driven member including a governor pressure signal passage, said governor pressure signal passage communicating with said control valve means and being adapted to distribute pressure to said governor valve means, and a governor transition valve in said signal passage comprising a fluid flow restricting branch passage in parallel relationship with respect to said signal passage, a transition valve chamber situated in said branch passage, a movable transition valve element in said transition valve chamber having two operating positions, spring means for normally urging said transition valve element to a first position to block said branch passage, said signal passage communicating with said transition valve chamber whereby the pressure in said signal passage acts upon said transition valve element to urge it to its other position thereby opening said branch passage, a governor valve body, two flow restricting orifices formed in said valve body, separate centrifugally responsive valve elements of different mass adapted to register with each orifice and restrict the same to a degree that is dependent upon the speed of rotation of said driven member, one side of each of said orifices communicating with the signal passage and the other side thereof communicating with the exhause region.

12. The combination as set forth in claim 8 wherein said auxiliary passage communicates with kickdown pressure areas formed on each of said separate fluid pressure distributor valve means whereby a common kickdown pressure is distributed to each distributor valve means to assert a downshifting influence on each of them.

References Cited by the Examiner
UNITED STATES PATENTS

| | | | |
|---|---|---|---|
| 2,732,732 | 1/1956 | Borman | 74—732 |
| 2,857,780 | 9/1958 | Ball | 74—472 |
| 2,865,227 | 12/1958 | Kelley et al. | 74—645 |
| 2,896,468 | 7/1959 | Cheek et al. | 74—472 |
| 3,003,367 | 9/1961 | Winchell | 74—688 |
| 3,086,541 | 4/1963 | De Corte | 137—56 |
| 3,117,464 | 1/1964 | Ivey | 74—472 |

DAVID J. WILLIAMOWSKY, *Primary Examiner.*

J. R. BENEFIEL, *Assistant Examiner.*